(12) United States Patent
Teng et al.

(10) Patent No.: US 6,324,020 B1
(45) Date of Patent: *Nov. 27, 2001

(54) METHOD AND APPARATUS FOR REDUCTION OF TRAPEZOIDAL DISTORTION AND IMPROVEMENT OF IMAGE SHARPNESS IN AN OPTICAL IMAGE CAPTURING SYSTEM

(75) Inventors: Harry H. Teng, Stanford, CA (US); Sung-Chan Jo, Seoul (KR)

(73) Assignee: SecuGen Corporation, Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/368,442

(22) Filed: Aug. 4, 1999

(51) Int. Cl.[7] .............................. G02B 17/00; G06K 9/00
(52) U.S. Cl. ..................... 359/726; 359/737; 359/798; 359/831; 356/71; 382/127
(58) Field of Search ...................... 359/726, 737, 359/798, 831, 837; 356/71; 382/124–127, 116; 340/5.53, 5.83

(56) References Cited

U.S. PATENT DOCUMENTS

| | | | |
|---|---|---|---|
| 3,527,535 | * 9/1970 | Monroe | 382/127 |
| 3,864,042 | * 2/1975 | Leventhal | 382/127 |
| 3,975,711 | 8/1976 | McMahon | 382/126 |
| 4,120,585 | 10/1978 | DePalma et al. | 356/71 |
| 4,135,147 | 1/1979 | Riganati et al. | 382/125 |
| 4,210,899 | 7/1980 | Swonger et al. | 382/125 |
| 4,340,300 | 7/1982 | Ruell | 356/71 |
| 4,414,684 | 11/1983 | Blonder | 382/127 |
| 4,668,995 | * 5/1987 | Chen et al. | 382/52 |
| 4,681,435 | 7/1987 | Kubota et al. | 356/71 |
| 4,832,485 | 5/1989 | Bowles | 356/71 |
| 4,872,203 | 10/1989 | Asai et al. | 382/124 |
| 4,983,415 | 1/1991 | Arndt et al. | 427/1 |
| 5,051,576 | 9/1991 | Schiller | 250/227.11 |
| 5,096,290 | 3/1992 | Ohta | 356/71 |
| 5,177,435 | 1/1993 | Kiyokawa et al. | 324/755 |
| 5,177,802 | 1/1993 | Fujimoto et al. | 382/124 |
| 5,189,482 | * 2/1993 | Yang | 382/127 |
| 5,210,588 | 5/1993 | Lee | 356/71 |

(List continued on next page.)

FOREIGN PATENT DOCUMENTS

| | | |
|---|---|---|
| 1286032 | 9/1991 | (CA) . |
| 19509751 | 9/1996 | (DE) . |
| 0 308 162 A2 | 3/1989 | (EP) . |
| 0 308 162 A3 | 3/1989 | (EP) . |

(List continued on next page.)

OTHER PUBLICATIONS

Seigo Igaki et al. (Jan. 1990). "Holographic Fingerprint Sensor," *Fujitsu Sci.Tech. J.*, JP, Fujitsu Limited. Kawasaki, 25(4): 287–296.

*Primary Examiner*—Evelyn A Lester
(74) *Attorney, Agent, or Firm*—Morrison & Foerster LLP (57) ABSTRACT

An apparatus and method for acquiring an image of a patterned object such as a fingerprint including a light refracting device, a focusing lens, and a light source. The light refracting device can, for example, be a prism and includes an imaging surface, a light receiving surface and a viewing surface. Incident light from the light source is projected through the light receiving surface and reflected off a surface other than the imaging surface. This reflected light is then projected onto the imaging surface to create an image of the patterned object from substantially all scattered light through the viewing surface. The lens is placed adjacent to the viewing surface to focus the light on an image sensor. The apparatus is configured to reduce or substantially eliminate trapezoidal distortion and improve overall image sharpness in an image of an object created by the apparatus.

19 Claims, 7 Drawing Sheets

U.S. PATENT DOCUMENTS

| | | | |
|---|---|---|---|
| 5,222,153 | 6/1993 | Beiswenger | 382/127 |
| 5,233,404 | 8/1993 | Lougheed et al. | 356/71 |
| 5,416,573 | 5/1995 | Sartor, Jr. | 356/71 |
| 5,548,394 | 8/1996 | Giles et al. | 356/71 |
| 5,623,553 * | 4/1997 | Sekiya | 382/127 |
| 5,635,723 | 6/1997 | Fujieda et al. | 250/556 |
| 5,680,205 | 10/1997 | Borza | 356/71 |
| 5,732,148 | 3/1998 | Keagy et al. | 382/124 |
| 5,737,071 | 4/1998 | Arndt | 356/71 |
| 5,740,276 | 4/1998 | Tomko et al. | 382/210 |
| 5,796,858 * | 8/1998 | Zhou et al. | 382/127 |
| 5,812,252 * | 9/1998 | Bowker et al. | 356/71 |
| 5,822,445 | 10/1998 | Wong | 382/127 |
| 5,875,025 * | 2/1999 | Toyoda et al. | 356/71 |
| 5,963,657 * | 10/1999 | Bowker et al. | 382/127 |
| 6,154,285 * | 11/2000 | Teng et al. | 356/71 |

FOREIGN PATENT DOCUMENTS

| | | | |
|---|---|---|---|
| 0 617 919 A2 | 10/1994 | (EP) | |
| 0 617 919 A3 | 10/1994 | (EP) | |
| 0 847 024 A2 | 6/1998 | (EP) | |
| 0 847 024 A3 | 6/1998 | (EP) | |
| 0 867 828 A2 | 9/1998 | (EP) | |
| 0 867 828 A3 | 9/1998 | (EP) | |
| 0 867 829 A2 | 9/1998 | (EP) | |
| 0 867 829 A3 | 9/1998 | (EP) | |
| 0847024 A | 10/1998 | (EP) | |
| 5216981 | 8/1993 | (JP) | |
| 7131322 | 5/1995 | (JP) | |
| 11102432 | 4/1999 | (JP) | |
| 61-145686 A * | 7/1986 | (JP) | 382/127 |
| 61-221883 A * | 10/1986 | (JP) | 382/127 |
| 62-74177 A * | 4/1987 | (JP) | 382/127 |
| 2-133892 A * | 5/1990 | (JP) | 382/127 |
| 2-188888 A * | 7/1990 | (JP) | 382/127 |
| 3-95693 A * | 4/1991 | (JP) | 382/127 |
| 3-246693 A * | 11/1991 | (JP) | 382/127 |
| 3-292578 A * | 12/1991 | (JP) | 382/127 |
| 9407344 | 8/1994 | (KR) | |
| WO 97/14111 | 4/1997 | (WO) | |
| WO 98/11478 | 3/1998 | (WO) | |
| WO 98/11501 A2 | 3/1998 | (WO) | |
| WO 98/11501 A3 | 3/1998 | (WO) | |
| WO 98/11750 | 3/1998 | (WO) | |
| WO 98/35118 | 8/1998 | (WO) | |

* cited by examiner

METHOD AND APPARATUS FOR REDUCTION OF TRAPEZOIDAL DISTORTION AND IMPROVEMENT OF IMAGE SHARPNESS IN AN OPTICAL IMAGE CAPTURING SYSTEM

FIELD OF THE INVENTION

The present invention relates to an optical acquisition apparatus for use with an image capturing and recognition system. In particular, the present invention includes an optical acquisition apparatus for reducing or substantially eliminating trapezoidal distortion in images of patterned objects and allowing such images to be more sharply focused.

BACKGROUND

Patterned object recognition systems are becoming common in industrial and commercial settings and have a variety of uses. For example, such systems can be used in scanners for the scanning of text, drawings, and photographs. Recently, manufacturers have been attempting to reduce costs associated with pattern recognition systems to make them more viable for consumer use. One such consumer application for pattern recognition systems includes fingerprint acquisition and recognition. Such a system is useful, for example, to enhance computer security by reading a potential user's fingerprint to compare with the fingerprints of users authorized to use the computer or access certain files or functions of the computer. Such a system could, for example, take the place of a security system that uses a login name and password.

The first thing such a fingerprint recognition system, or any pattern recognition system, must be able to do is to accurately acquire the fingerprint, or other pattern, for analysis. A number of mechanisms exist for such acquisition of pattern data. For example, U.S. Pat. Nos. 3,975,711; 4,681,435; 5,051,576; 5,177,435 and 5,233,404 all disclose apparatuses for acquiring an image of a patterned object.

Figure 1:
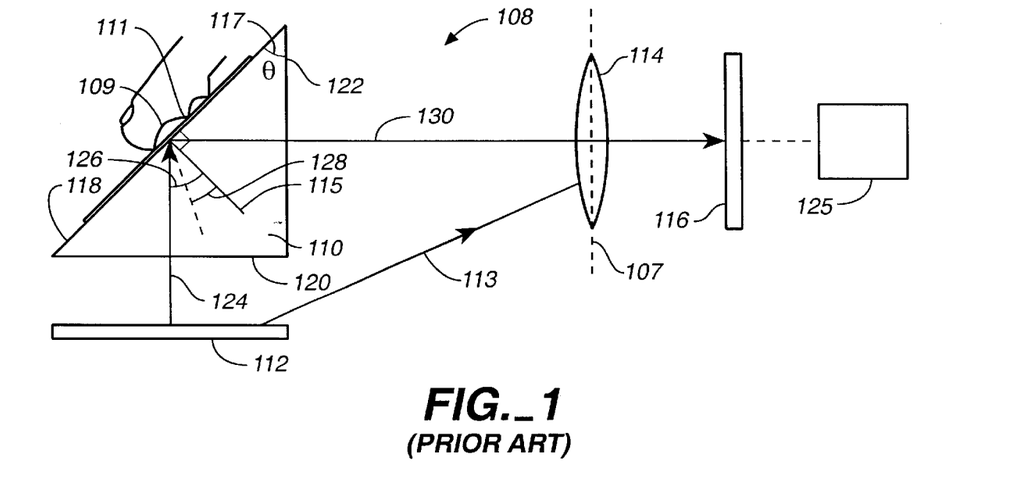
FIG. 1 is a schematic of a prior art image acquisition apparatus which utilizes an absorption image acquisition technique.

FIG. 1 shows a schematic diagram of one such prior art optical fingerprint capturing and recognition system. In FIG. 1, an optical recognition system 108 includes a light source 112, an optical triangular prism 110, a lens assembly 114, an image sensor 116, and a storage and processing unit 125. The prism 110 includes an imaging surface 118, a light receiving surface 120, and a viewing surface 122. Imaging surface 118 is the surface against which a patterned object, such as a fingerprint, is placed for imaging. The light source 112, which may, for example, be a light emitting diode (LED), is placed adjacent to light receiving surface 120 and generates incident light 124 that is transmitted to the optical prism 110. The optical prism 110 is an isosceles right triangle, with the angle opposite the imaging surface 118 being approximately 90 degrees and the other two "base" angles (that is, the two angles of an isosceles prism that are equal) each being approximately 45 degrees.

Generally, incident light 124 strikes imaging surface 118 at an angle 126 with the incident surface normal line 115. Angle 126 is greater than the critical angle 128. In general, a critical angle is measured between an incident light ray and a normal line to a surface. If incident light strikes a surface at an angle greater than the critical angle, the incident light will undergo total internal reflection off the surface, if the incident light strikes the surface at an angle less than the critical angle, the incident light will substantially pass through the surface. Accordingly, critical angle 128 is the angle with the normal line to the imaging surface 118 above which incident light will totally internally reflect from imaging surface 118 and pass out of prism 110 as reflected light 130 through viewing surface 122.

Reflected light 130 passes through lens assembly 114 located adjacent to viewing surface 122. Lens assembly 114 may contain one or more optical lenses. Thereafter, light from lens assembly 114 is captured by image sensor 116. Image sensor 116, which may, for example, be a charge coupled device (CCD) or a complementary metal oxide semiconductor (CMOS) device, captures optical light images and converts them to electrical signals. Such image sensors are well known to those skilled in the art. The electrical signals are then transmitted to the storage and processing unit 125.

Storage and processing unit 125 may include a memory unit, a processor and an analog to digital converter (not shown). The analog to digital converter converts the analog electrical signals from the image sensor 116 into digital data. The memory is used to store the digital data and algorithms for comparing a captured fingerprint image with a stored fingerprint image. The processor compares the captured digital data with data previously stored in memory based on an algorithm for comparing such data. The processor may also analyze the captured digital data for purposes different from comparison with stored data. Such storage and processing units are known to those skilled in the art and can include standard personal computers equipped with appropriate software. Algorithms for processing and comparison of image data are disclosed, for example, in U.S. Pat. Ser. Nos. 4,135,147 and 4,668,995 each of which is incorporated in its entirety by reference.

When a fingerprint is placed on the optical prism's imaging surface 118, ridges 111 of the fingerprint contact imaging surface 118, and valleys 109 of the fingerprint remain out of contact with imaging surface 118. Thus, in fingerprint valleys 109 incident light 124 entering optical prism 110 from light source 112 undergoes total internal reflection at imaging surface 118 if the incidence angle of the incoming light exceeds the critical angle of the optical prism 110. However, at ridges 111 of a fingerprint some of incident light 124 is absorbed and scattered off the fingerprint ridge. As used herein, the term "scattered" indicates light which, after striking an irregular surface, is radiated or irregularly reflected off the irregular surface in multiple directions.

As a result of this scattering and/or absorption, there is less than total internal reflection of incident light 124 at fingerprint ridges 111. Thus, the intensity of reflected light 130 leaving prism 110 from the valleys 109 of a fingerprint is of greater intensity than reflected light 130 leaving prism 110 from ridges 111. The lower intensity reflected light 130 from ridges 111 translate into darker regions to indicate the presence of an object at the point of incidence between the light beam and the fingerprinting surface. Conversely, higher intensity reflected light 130, such as that which undergoes total internal reflection, translates into brighter regions to indicate the absence of an object at the point of incidence between the incident light 124 and the imaging surface 118. This allows distinguishing the darker fingerprint ridges 111 from the relatively brighter fingerprint valleys 109. Because absorption of incident light at fingerprint ridges 111 is primarily responsible for creating a fingerprint image, system 108 is referred to as an "absorption" imaging system.

The above described system allows capturing an optical fingerprint image and processing the electrical representation of the optical fingerprint image. However, in regions of fingerprint ridges 111, incident light 124 still undergoes some total internal reflection and some scattering in a direction parallel to reflected light 130. Thus, the difference in intensity between reflected light 130 from fingerprint valleys 109 and fingerprint ridges 111 can be relatively low. That is, the contrast between fingerprint ridges 111 and valleys 109 in the fingerprint image can be relatively low. This can make image acquisition, processing, and comparison relatively difficult.

Additionally, in optical recognition system such as optical recognition system 108 it can be desirable that the diameter of the first lens in lens assembly 114 be smaller than the image of a fingerprint on viewing surface 122. This both allows optical recognition system 108 to be relatively small and can be less expensive to manufacture.

Figure 2:
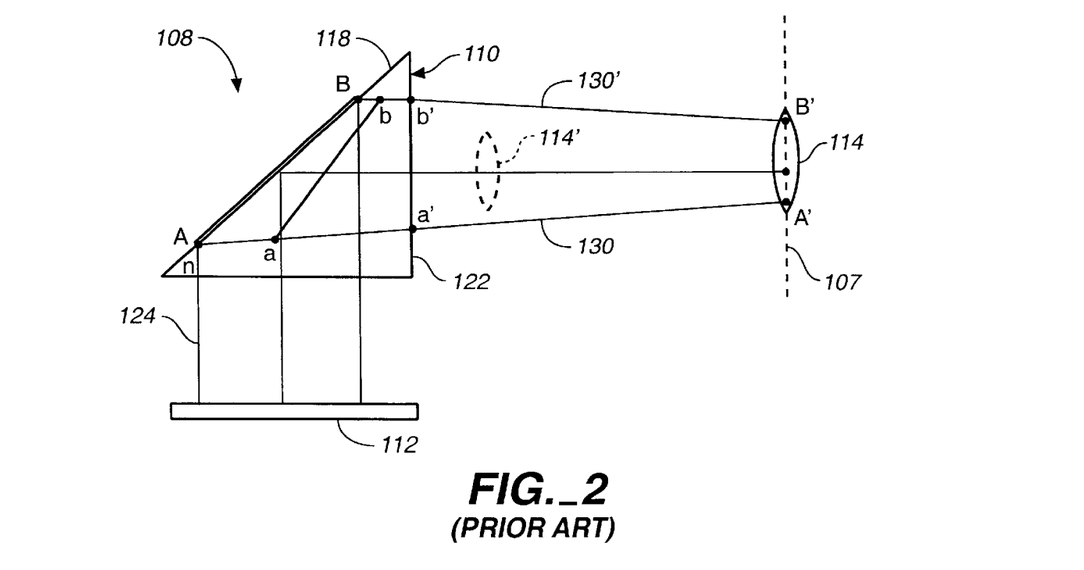
FIG. 2 is a schematic of the image acquisition apparatus of FIG. 1 illustrating trapezoidal distortion.

However, as shown in FIG. 2, in an absorption type system such as system 108, if the diameter of the first lens of lens assembly 114 is smaller than the fingerprint on imaging surface 118, then the lens assembly 114 must generally be placed relatively far from viewing surface 122. This allows the image of a fingerprint captured by system 108 to be relatively sharp all the way to the edges of the fingerprint image. That is, if lens assembly 114 is placed too close to viewing surface 122, the edges of a fingerprint image could be lost or distorted near the edges of the image. This is because in an absorption system such as system 108, the light rays which generate the image of the fingerprint must be substantially parallel for the image to be in focus. And, if the first lens in lens assembly 114 is smaller than the fingerprint in imaging surface 118, then the light rays from the edges of the fingerprint image that are parallel to light rays from areas closer to the center of a fingerprint image may not be able to enter lens assembly 114. This can cause the edges of a fingerprint image to be out of focus or lost.

Thus, as shown in FIG. 2, if the lens assembly for optical recognition system 108 were placed where lens assembly 114' is shown (in phantom), then substantially parallel rays of reflected light 130 and 130' would not enter lens assembly 114'. For this reason, system 108 would not produce a sharp image of a fingerprint placed on imaging surface 118 at points A and B if the lens assembly were placed at the location of lens assembly 114'.

Thus, as shown in FIG. 2, in an absorption system, the reduction in size gained by manufacturing a relatively small first lens of lens assembly 114 can be lost because lens assembly 114 must be placed at a relatively large distance from viewing surface 122 in order to capture the entire fingerprint image using light rays that are substantially parallel. For this reason, making optical recognition system 108 relatively compact can be problematic. Additionally, a relatively large distance between viewing surface 122 and lens assembly 114 can cause loss of contrast in the fingerprint image due to light interference.

Further, when the first lens in lens assembly 114 is smaller than an image of a fingerprint at viewing surface 122, a phenomenon known as trapezoidal distortion can occur in optical recognition system 108. Trapezoidal distortion in an imaging system has the effect of making the image of a square created by the system appear as a trapezoid.

FIG. 2 is a schematic illustration showing why trapezoidal distortion arises in optical recognition system 108. Incident light 124 from light source 112 enters prism 110 and reflects off imaging surface 118, imaging object AB. Reflected light 130 then passes out of viewing surface 122 and to lens assembly 114 at points A' and B' to form object A'B'. Viewing object AB through viewing surface 122, object AB would appear to be located at an "apparent image" object ab. Specifically, point A appears to be at point a, a distance aa' from viewing surface 122 and point B appears to be at point b, a distance bb' from viewing surface 122. The distance that an apparent image of an object appears from viewing surface 122 is given by the actual distance the object is from viewing surface 122 divided by the index of refraction n of prism 110. Specifically, the distance aa' is given by:

aa'=Aa'/n, where n is the index of refraction of prism 110. Similarly, bb'=Bb'/n.

Trapezoidal distortion occurs when the light path length from the apparent image of an object to the lens plane 107 of lens assembly 114 is different for different parts of the imaged object and the object lens of the lens assembly 114 is smaller than the image of the fingerprint through viewing surface 122. Specifically, trapezoidal distortion occurs in system 108 because the distance aA' is longer than the distance bB' and lens assembly 114 has a smaller diameter than the distance a'b' on viewing surface 122.

Another consequence of distance aA' being larger than distance bB' is that an image of an object which is sharply focused at each part of the image can be difficult to obtain. More generally, whenever the light path length from the apparent image of an object to the lens plane, and ultimately image sensor, of a lens assembly is different for different parts of the imaged object, parts of the image of the object at the lens plane may be in relatively sharp focus and parts of the image may be out of focus.

To correct both the problems of trapezoidal distortion and having a portion of an image of an object which is out of focus, prior art manufacturers have tilted the lens plane 107 of lens assembly 114 and image sensor 116 to increase the distance bB' and decrease the distance aA' to a point where the two distances are approximately equal. However, it is a property of an isosceles right prism (that is, a triangular prism in which the base angles measure approximately 45 degrees and the non-base angle, or apex angle, measures approximately 90 degrees), that reflected light 130 exits prism 110 substantially normal to viewing surface 122. That is, no refraction of reflected light 130 occurs as it exits viewing surface 122. Further, generally, the larger the angle of incidence on a surface of a transparent object, the greater the portion of incident light that is reflected from the surface. Thus, while tilting lens assembly 114 and the sensor can reduce trapezoidal distortion and increase image sharpness, it also causes greater reflection of reflected light 130 off the surface of lens assembly 114, and the surface of image sensor 116, because reflected light 130 strikes lens assembly 114 at a greater angle of incidence. This reduces the intensity of light entering image sensor 116, making image processing and comparison more difficult.

Additionally, the relative placement of light source 112 and lens assembly 114 make it possible for stray light 113 emitted by light source 112 to enter lens assembly 114. This can generate additional background "noise" light which can further reduce the quality of a captured image and make image processing more difficult.

Figure 3:
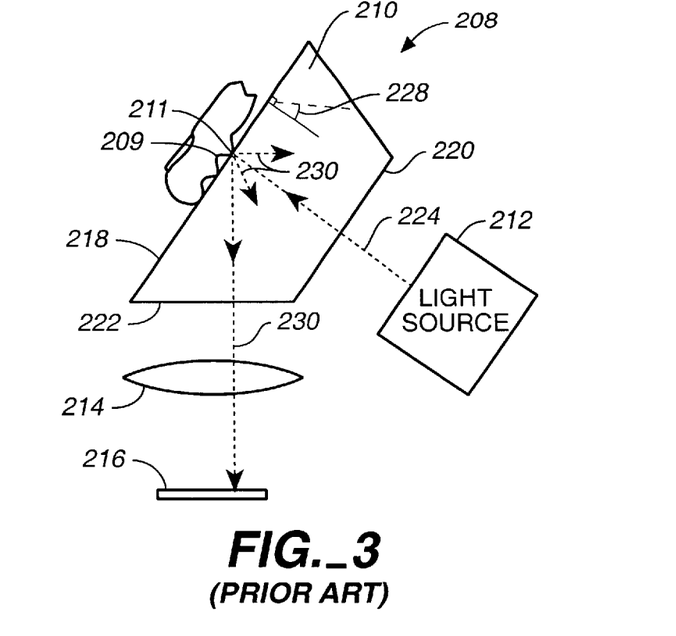
FIG. 3 is a schematic of a second prior art image acquisition apparatus which utilizes a scattering image acquisition technique.

To overcome some of the difficulties associated with the type of absorption image acquisition system described above, acquisition systems have been designed which are based primarily on "scattering" mechanisms rather than absorption mechanisms. One such acquisition system is disclosed by U.S. Pat. No. 5,233,404 issued to J. Lougheed et al. on Aug. 3, 1993 (Lougheed et al.). FIG. 3 is a schematic diagram illustrating the image acquisition portion of the apparatus disclosed by Lougheed et al. As shown in FIG. 3, a prior art image acquisition system 208 includes a trapezoidal prism 210, a light source 212, a lens assembly 214 and an image sensor 216. The trapezoidal prism 210 includes at least an imaging surface 218, a light receiving surface 220, and a viewing surface 222.

The imaging surface 218 is the surface against which an object to be imaged, such as a fingerprint, is placed. The light source 212 is located adjacent to and facing the light receiving surface 220 which is substantially parallel to imaging surface 218. Thus, incident light 224 emitted by light source 212 projects light through prism 210 and onto imaging surface 218 at an angle which is generally less than the critical angle 228 of prism 210. Therefore, in the valleys 209 of a fingerprint placed against imaging surface 218 where the fingerprint is not in contact with imaging surface, total internal reflection does not occur and incident light 224 passes through imaging surface 218. At points where fingerprint ridges 211 are in contact with imaging surface 218, incident light 224 strikes the fingerprint ridge to generate scattered (or equivalently, irregularly reflected) light 230. Scattered light 230 propagates back into prism 210 in substantially all directions including the direction of lens assembly 214, located adjacent to viewing surface 222. Scattered light passes through viewing surface 222 and into lens assembly 214 to be detected by image sensor 216, which, as above, can be a CCD, CMOS or other type of detector.

In the region of a fingerprint valley 209, incident light 224 passes through imaging surface 218. And, in the area of a fingerprint ridge 211, incident light 224 scatters off imaging surface 218 to be picked up by lens assembly 214 and image sensor 216. Accordingly, the image of the fingerprint is relatively bright at fingerprint ridges 211 and relatively dark at fingerprint valleys 209. Because scattered light 230 is picked up by the image sensor 216, this type of system is referred to as a "scattering" system.

The difference in intensity, or ratio of intensity, between the ridges and valleys in a fingerprint image created by such a scattering system can be greater than the difference in intensity, or ratio of intensity, between the ridges and valleys of a fingerprint image created in an absorption system as shown in FIG. 1. As a result, the fingerprint image created by such a scattering system can display higher contrast between fingerprint ridges and valleys than an image created by an absorption system. Thus, the image can be more accurately acquired by the image sensor 216. This can reduce errors in subsequent fingerprint comparisons performed by the system.

Additionally, it is a property of a scattering system that the rays of light which enter lens assembly 214 to produce an image of a fingerprint in a scattering system do not need to be parallel to produce a sharp image. Thus, if the first lens in lens assembly 214 is smaller than the image of the fingerprint in viewing surface 222, lens assembly 214 can still be placed relatively close to viewing surface 222 without loss of image sharpness near the edges of the image.

However, a trapezoidal prism such as prism 210 can be more expensive to manufacture than a triangular prism such as prism 110, shown in FIG. 1. This is because, among other reasons, there is an extra surface to polish. This can increase the price of an imaging system such as imaging system 208, making it less viable for consumer use.

Additionally, because of differences in scattered light path lengths from different portions of the apparent image of the fingerprint in prism 210 to lens assembly 214, image acquisition system 208 can cause portions of a fingerprint image to be out of focus in a manner similar to that of optical recognition system 108. Additionally, though not shown in FIG. 3, if the first lens in lens assembly 214 of image acquisition system 208 is smaller than a fingerprint image on viewing surface 222 the differences in scattered light path lengths from different portions of the apparent image of the fingerprint in prism 210 to lens assembly 214 and image sensor 216 can also cause trapezoidal distortion.

As the above discussion makes clear, there is a need for improved image acquisition apparatus for use with patterned object recognition systems. Specifically, an image acquisition apparatus which produces an image having reduced or substantially eliminated trapezoidal distortion would be desirable. Additionally, an image acquisition system which generates an image in which substantially the entire image is in focus is also desirable. The image acquisition system should also be relatively compact and inexpensive to manufacture.

SUMMARY OF THE INVENTION

The present invention includes a compact image acquisition apparatus which produces a high contrast, low distortion image which has reduced or substantially no trapezoidal distortion. Additionally, the image acquisition system of the present invention can be relatively low cost to manufacture. The apparatus includes a light refractor having an imaging surface against which a patterned object is to be placed to form an apparent image of the patterned object in the light refractor, a further surface, and a viewing surface. The viewing surface is adjacent to the imaging surface and forms an angle y therewith. An image of the patterned object is projected through the viewing surface. The apparatus also includes a lens adjacent to the viewing surface for receiving and focusing an image of a patterned object. The lens has a lens plane which is perpendicular to an optical axis of the lens and which forms an angle δ with the viewing surface. The angles γ and δ are formed to substantially equalize a path length of a first light ray traveling from one part of the apparent image of the patterned object to the lens plane, and ultimately, to the image sensor, with a path length of any other light ray substantially parallel to the first light ray and traveling from another part of the apparent image of the patterned object to the lens plane, and ultimately, the image sensor. Preferably, this is achieved by fixing angles γ and δ to conform to the equation:

$$0.7 \leq (n^2 - \sin^2 \delta)^{1/2} (\cot \gamma)(\sin \delta) + \sin^2 \delta \leq 1.30.$$

In another aspect of the present invention, preferably, every point of the portion of the imaging surface against which an object to be imaged is to be placed is able to have at least one light ray scattered therefrom such that the intersection of the light ray and the viewing surface form an angle, adjacent to the intersection of the viewing surface and the imaging surface, which is less than 90 degrees.

In yet another aspect of the present invention, a method of generating an image of a patterned object includes providing a light refractor having an imaging surface, a viewing surface, and a further surface. An angle γ is formed between a plane defined by the viewing surface and a plane defined by the imaging surface. A patterned object is placed against the imaging surface and incident light is projected into the light refractor. The incident light is scattered off the imaging surface and patterned object and through the viewing surface. A lens is provided adjacent to the viewing surface and an angle δ is formed between the focal plane of the lens and the plane defined by the viewing surface. The angles γ and δ are fixed to substantially equalize a path length of a first light ray traveling from one part of an apparent image of the patterned object formed in the light refractor to the lens plane, and ultimately the image sensor, with a path length of any other light ray substantially parallel to the first light ray and traveling from another part of the apparent image of the patterned object to the lens plane and image sensor. Preferably, the angles γ and δ are fixed so that they are related by the equation:

$$0.7 \leq (n^2 \sin^2 \delta)^{1/2} (\cot \gamma)(\sin \delta) + \sin^2 \delta \leq 1.30$$

Additionally, it is preferable that the portions of the imaging surface to be used for imaging are each able to have at least one light ray scattered therefrom such that the intersection of the light ray and the viewing surface form a first angle, adjacent to the intersection of the viewing surface and the imaging surface, which is less than 90 degrees.

The apparatus and method discussed above allow forming an image of a patterned object which has reduced, or is substantially free of, trapezoidal distortion and which can generate an image the entirety of which is in relatively sharp focus. This advantageously facilitates more accurate processing and comparison of patterned object images.

DETAILED DESCRIPTION

Figure 4:
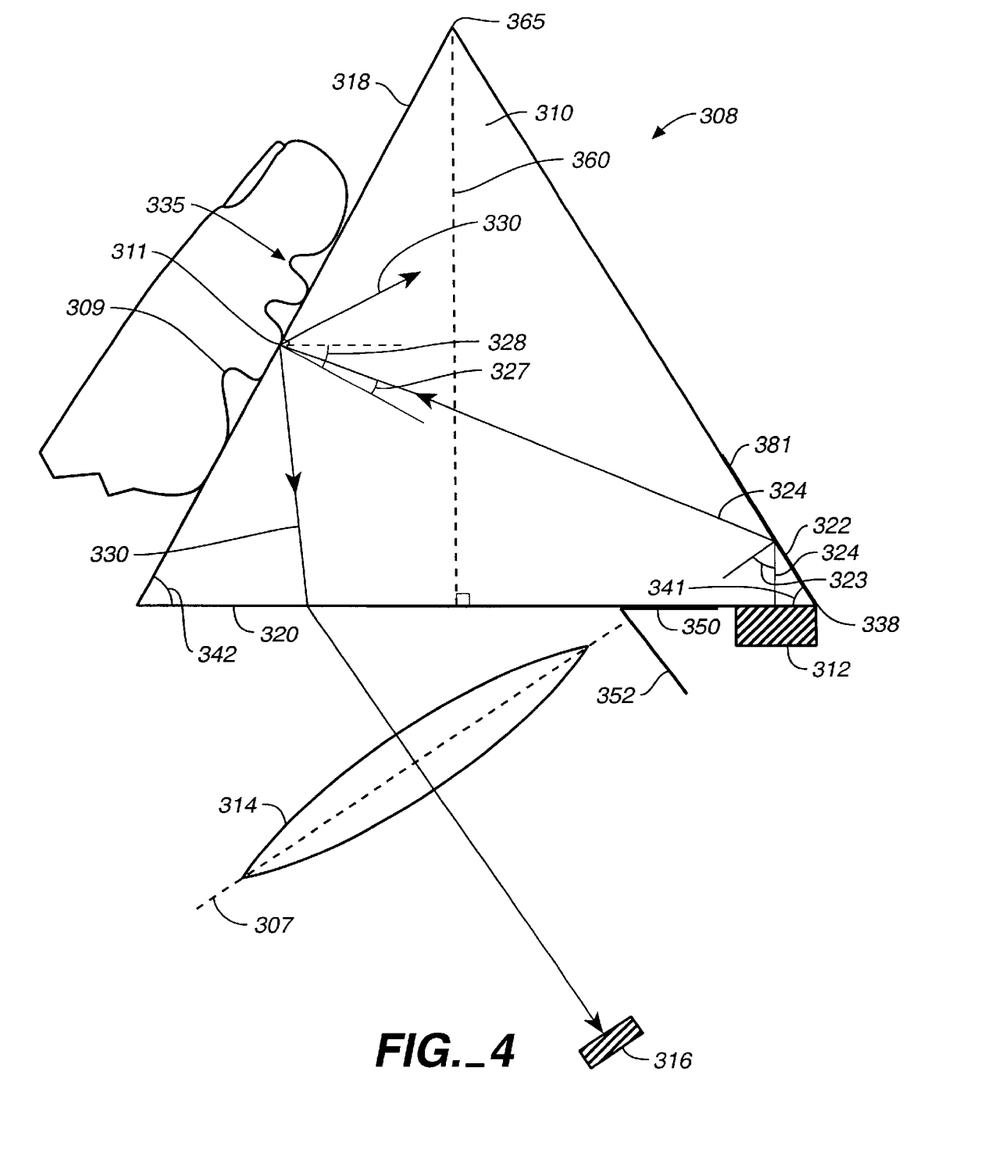
FIG. 4 is a schematic diagram of an image acquisition system including a prism, light source, lens assembly, and image sensor, in accordance with the present invention.
Figure 5:
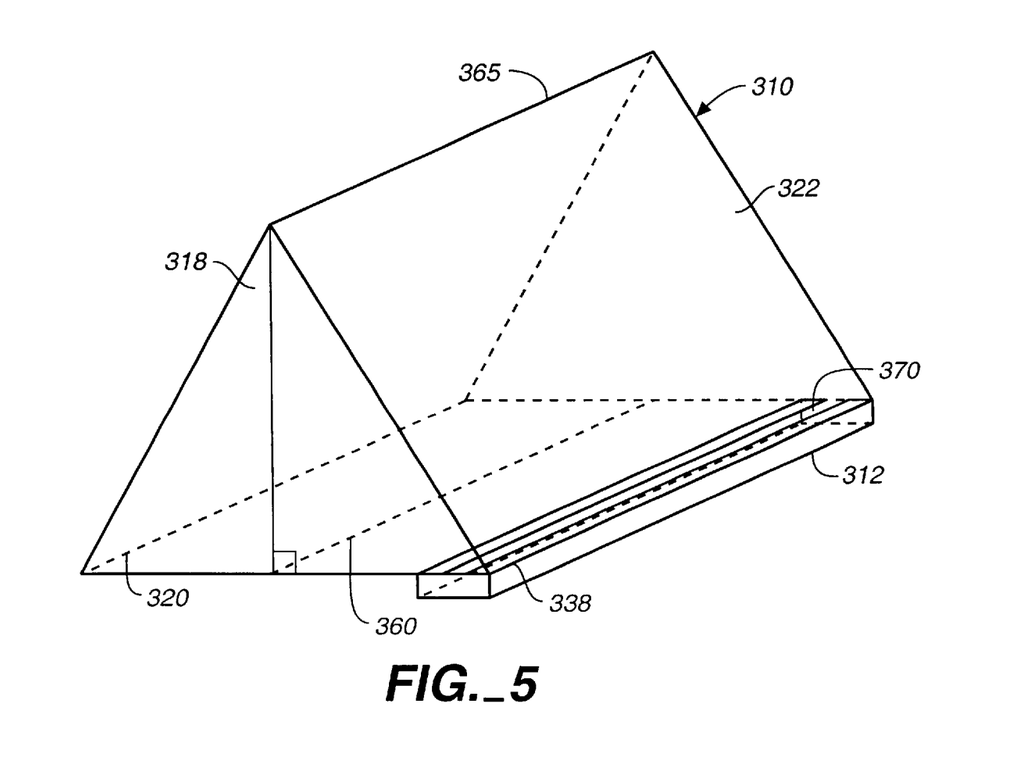
FIG. 5 is a perspective view of the prism and light source shown in FIG. 4.

FIGS. 4 and 5 show a patterned object image acquisition system 308 in accordance with the present invention. Acquisition system 308 preferably includes a triangular prism 310, a light source 312, a lens assembly 314, and an image sensor 316. Prism 310 is a five faced triangular prism the length of which extends into the plane of FIG. 4. Prism 310 includes a rectangular, planar, imaging surface 318 against which an object to be imaged, such as a fingerprint 335, is placed. Prism 310 also includes a rectangular, planar, viewing surface 320 through which an image of a fingerprint 335 placed against imaging surface 318 passes out of prism 310.

In the embodiment of FIGS. 4 and 5, viewing surface 320 also serves as a light receiving surface for allowing light to pass into prism 310. A light scattering surface 322 comprises a third, or further, rectangular, planar, surface of prism 310. For reasons detailed below, light scattering surface 322 is preferably a diffusive.

Light source 312 is preferably an elongated LED array consisting of a single row of light emitting diodes (LEDs) extending the length (into the plane of FIG. 4) of prism 310. If such LEDs are used as light source 312, a diffusive cover can be placed between the LEDs and viewing surface 320 to provide more even illumination of imaging surface 318. It is also within the ambit of the present invention, however, for light source 312 to be any other type of light source to provide incident light into prism 310. Preferably, light source 312 is placed along an edge 338 of prism 310 which is opposite imaging surface 318. However, it is also within the ambit of the present invention to configure and locate a light source for acquisition system 308 in any other way. For example, other configurations for light sources which can be used with the present invention are disclosed in commonly assigned, co-pending U.S. patent application Ser. No. 09/191,428 for "High Contrast, Low Distortion Optical Acquisition System for Image Capturing" filed Nov. 12, 1998, still pending, which is hereby incorporated by reference in its entirety. This includes placing light source 312 against viewing surface 320 anywhere between edge 338 and the line 360 along viewing surface 320 formed by the intersection of viewing surface 320 and a perpendicular line to viewing surface 320 which intersects edge 365.

Figure 7:
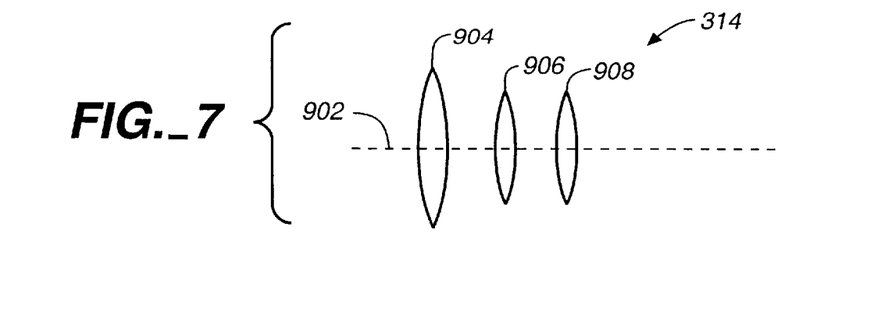
FIG. 7 is a schematic diagram showing a lens assembly which can be used with the image acquisition system shown in FIG. 4.

Lens assembly 314 is for receiving scattered light 330 from fingerprint 335 and focusing scattered light 330 onto image sensor 316. Lens assembly 314 can be a single lens or, preferably, can consist of multiple lenses. Most preferably, lens assembly 314 has a focal length of approximately 13.48 mm and is located approximately 13.5 mm from viewing surface 320. Additionally, as shown in FIG. 7 which is a schematic diagram of one embodiment of lens assembly 314, lens assembly most preferably consists of three lenses 904, 906, and 908 whose respective optical axes are aligned on a common optical axis 902. Lens 904 most preferably has a diameter of approximately 17.8 mm, and both lenses 906 and 908 most preferably have a diameter of approximately 6 mm. It is considered that any number of lenses be included in lens assembly 314.

Image sensor 316 captures optical light images from lens assembly 314 and converts them to electrical signals. Image sensor 316 can be a charge couple device ("CCD") or any other means of converting a light signal into either an analog or digital electrical signal. Preferably, image sensor 316 is a complementary metal oxide semiconductor device. CCD and CMOS image sensors are well known by those skilled in the art. The electrical signals generated by image sensor 316 can be processed using known means and used to compare input patterns, such as fingerprints. As noted in the Background section, such signal processing means are disclosed, for example, in U.S. Pat. Nos. 4,135,147 and 4,668,995, which have been incorporated by reference.

To create an optical image of fingerprint 335 on image sensor 316, fingerprint 335 is placed against imaging surface 318. Incident light 324 from light source 312 passes through viewing surface 320 and into prism 310. Because light source 312 is located adjacent to edge 338, incident light 324 strikes scattering surface 322. As noted above, scattering surface 322 is preferably diffusive. As such, a relatively high portion of incident light 334 striking scattering surface 322 is internally scattered in prism 310. This scattered light then strikes imaging surface 318. Even if light scattering surface 322 is not diffusive, substantially all of incident light 324 will strike scattering surface 322 at an angle 323 which is greater than the critical angle for scattering surface 322. Thus, incident light will reflect off scattering surface 322 and strike imaging surface 318. To enhance reflection of incident light off scattering surface 322 it is contemplated to place a mirrored face of a reflecting surface 381 towards scattering surface 322.

Because incident light 324 has been scattered or directly reflected off scattering surface 322, a relatively large percentage of incident light 324 will strike imaging surface 318 at an angle 327 less than the critical angle 328 of prism 310. Accordingly, incident light 324 which strikes imaging surface 318 at a region thereof where there is a fingerprint valley 309 will not undergo total internal reflection and will substantially pass through imaging surface 318. Thus, substantially no light hitting an area of imaging surface 318 where there is a fingerprint valley 309 will be directed into the sensor 316. However, incident light 324 that strikes a region of imaging surface 318 where there is a fingerprint ridge 311 touching imaging surface 318 will substantially scatter, producing scattered light 330. A portion of scattered light 330 will exit prism 310 via viewing surface 320. Upon exiting prism 310, scattered light 330 will refract into lens assembly 314 which will focus scattered light 330 into image sensor 316.

Because incident light 324 can be scattered by scattering surface 322, incident light 324 provides relatively uniform illumination over imaging surface 318 which produces a relatively uniform image. Such a uniform image is desirable because it is easier to process and compare with other stored fingerprint data. To further increase the uniformity of illumination over imaging surface 318, the portion of viewing surface 320 facing light source 312 can be streaked by etching lines 370, shown in FIG. 5, on viewing surface 320. Lines 370 run the length of prism 310 and parallel to apex 338. Lines 370 act to diffuse light emitted from light source 312 as it passes through viewing surface 320.

In addition to the components discussed above, image acquisition system 308 preferably also includes a light blocking shield 350 on a portion of light receiving surface adjacent to light source 312. Preferably, light blocking shield runs the entire length of prism 310 (into the plane of FIG. 4). Light blocking shield 350 is to reduce the amount of stray light from light source 312 which might enter lens assembly 314 and interfere with or cloud a fingerprint image. It is also considered that the surface of light blocking shield 350 facing the interior of prism 310 be mirrored. This mirroring can act to desirably increase the intensity of scattered light incident on imaging surface 318. In addition to, or instead of, light blocking surface 350, a second light blocking surface 352 can be placed between light source 312 and lens assembly 314. Light shield 352 preferably extends from viewing surface 320 at an angle to block stray light from light source 312 from entering lens assembly 314.

Because light source 312 is relatively narrow and located adjacent to edge 338 opposite imaging surface 318, substantially all incident light 324 reaching imaging surface 318 is reflected or scattered into the lens assembly 314. That is, almost no incident light 324 can be captured by the image sensor 316 without scattering off the imaging surface 318 at the points of contact with fingerprint ridges 311. To further reduce the likelihood of incident light 324 which falls into the fingerprint valleys 309 reaching image sensor 316 through lens assembly 314, light source 312 is preferably configured not to extend past a line 360, shown in FIG. 5, extending the length of prism 310 and defined by the intersection of a plane normal to viewing surface 320 and intersecting with edge 365, adjacent to imaging surface 318. If light source 312 is kept on the same side of this line as apex 338, then substantially no incident light 324 emitted perpendicularly from light source 312 will reach image sensor 316 without scattering off of the fingerprint ridges 311.

By minimizing the incident light 324 from light source 312 that is directly incident on imaging surface, there is substantially no total internal reflection of incident light 324 from regions of imaging surface 318 where there are fingerprint valleys 309. This means that substantially no light from these valley regions passes through viewing surface 320 and into lens assembly 314. Rather, substantially all the light passing into lens assembly 314 from imaging surface 318 is scattered from fingerprint ridges 311 on imaging surface 318. This provides a fingerprint image having relatively high contrast between fingerprint ridges 311 and valleys 309. Such a high contrast fingerprint image is relatively easy to process and compare with other fingerprint images and can, therefore, advantageously increase processing accuracy.

Further, use of this scattering technique for image acquisition is achieved with a triangular prism, as opposed to a trapezoidal prism as disclosed in Lougheed, discussed in the Background section. Because triangular prisms can be more efficient to manufacture than trapezoidal prisms, image acquisition system 308 can advantageously be relatively less expensive to manufacture.

Moreover, scattered light generally scatters from an object in many directions, as opposed to substantially one direction. And, as noted in the Background, nonparallel scattered light can be used by a lens assembly to form a focused image of an object. Thus, as shown in optical recognition system 318 in FIG. 6, if the first lens of lens assembly 314 has a smaller diameter than the diagonal of fingerprint 335 in viewing surface 320, non-parallel scattered light rays can be used to produce a focused image of fingerprint 335. Accordingly, lens assembly 314 can be, but does not necessarily need to be, placed relatively close to viewing surface 320 without loss of image quality near the edges of a fingerprint image generated by system 308. This advantageously allows the image acquisition system 308 to be relatively compact and allows lens assembly 314 to be relatively low cost to manufacture.

Figure 6:
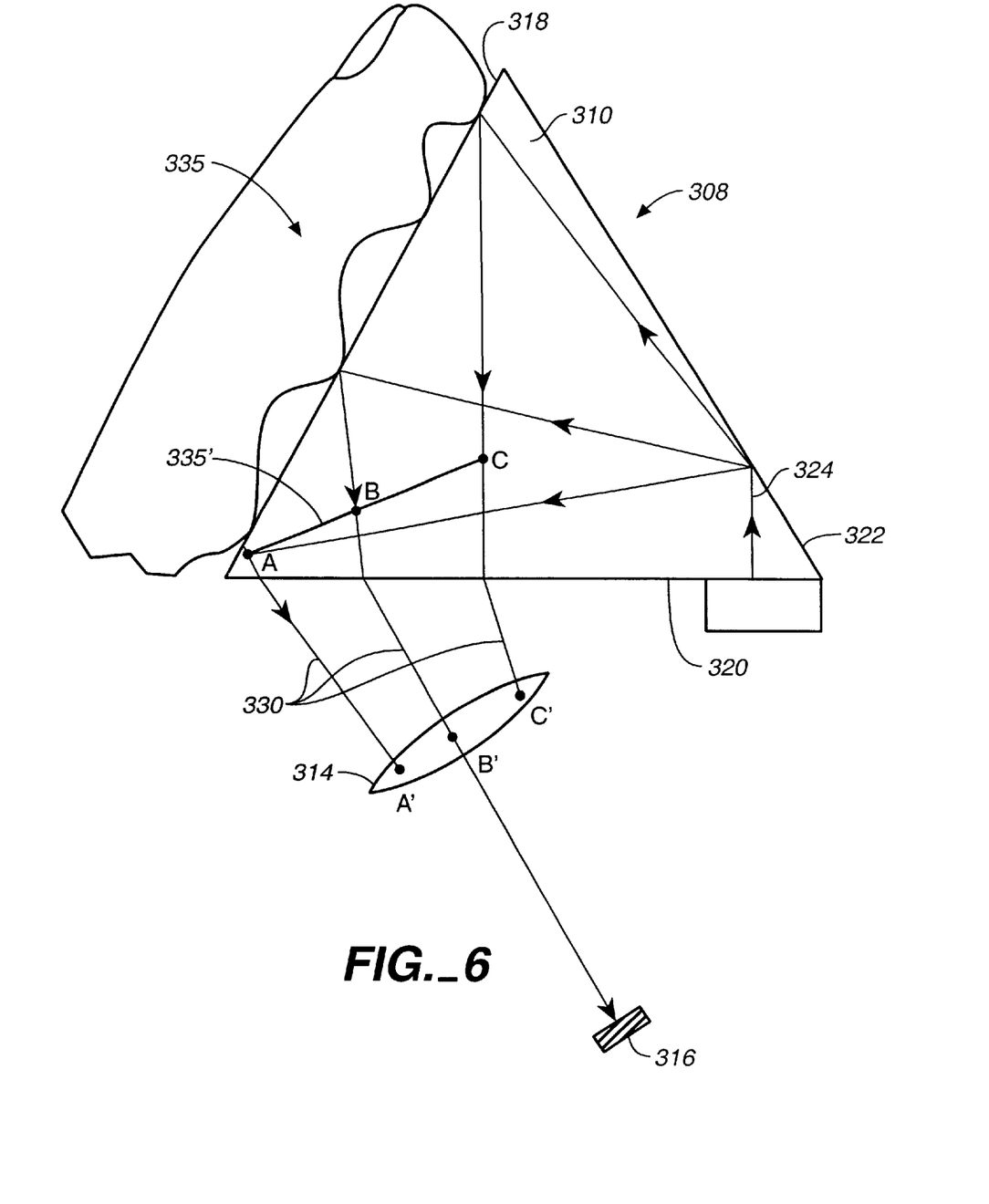
FIG. 6 is a schematic diagram of the image acquisition system shown in FIG. 4 illustrating how trapezoidal distortion is reduced.

Because, as shown in FIG. 6, the diameter of a first lens of lens assembly 314 is smaller than the size of the fingerprint on imaging surface 318, trapezoidal distortion could result in a generated image. However, the image acquisition system of the current invention can reduce trapezoidal distortion in, and increase the overall sharpness of, a produced image. As discussed in the Background section, trapezoidal distortion is manifested in an image having dimensions distorted from those of the actual object being imaged. Both trapezoidal distortion and portions of an image being out of focus can be caused by variation in path length of light from the apparent image of an object to lens assembly 314, and ultimately image sensor 316, from one part of the imaged object to another. As shown in FIG. 6, however, in image acquisition system 308, the path length of scattered light 330 from different points on the apparent image 335' of fingerprint 335 to lens assembly 314 and image sensor 316 is substantially the same. Specifically, path AA' is substantially equal to path BB' and path CC'. Thus, trapezoidal distortion can advantageously be reduced and overall image sharpness can be increased. As shown in FIG.

6, substantial equalization of paths AA', BB' and CC' is facilitated by tilting lens assembly 314 with respect to viewing surface 320.

However, unlike optical recognition system 108, shown in FIG. 1, such tilting of lens assembly 314 does not severely reduce the intensity of the image reaching image sensor 316. As noted in the background section with respect to optical recognition system 108, tilting lens assembly 114 causes reflected light 130 to strike the first element of lens assembly 314 at an angle to normal line thereof. This causes greater reflection of reflected light 130 from the surface of lens assembly 114, thereby undesirably reducing image intensity at image sensor 116.

However, prism 310 preferably has an index of refraction higher than 1. Thus, scattered light 330 which strikes viewing surface 320 refracts away from the normal to viewing surface 320 as it exits prism 310. As such, by tilting the lens plane 307 of lens assembly 314, scattered light 330 strikes lens assembly 314 at substantially 90 degrees. Thus, there is little or no loss in image intensity due to undue reflection of scattered light at the surface of lens assembly 314, and trapezoidal distortion can be reduced, and overall image sharpness can be increased, without losing image intensity at image sensor 316.

Figure 8:
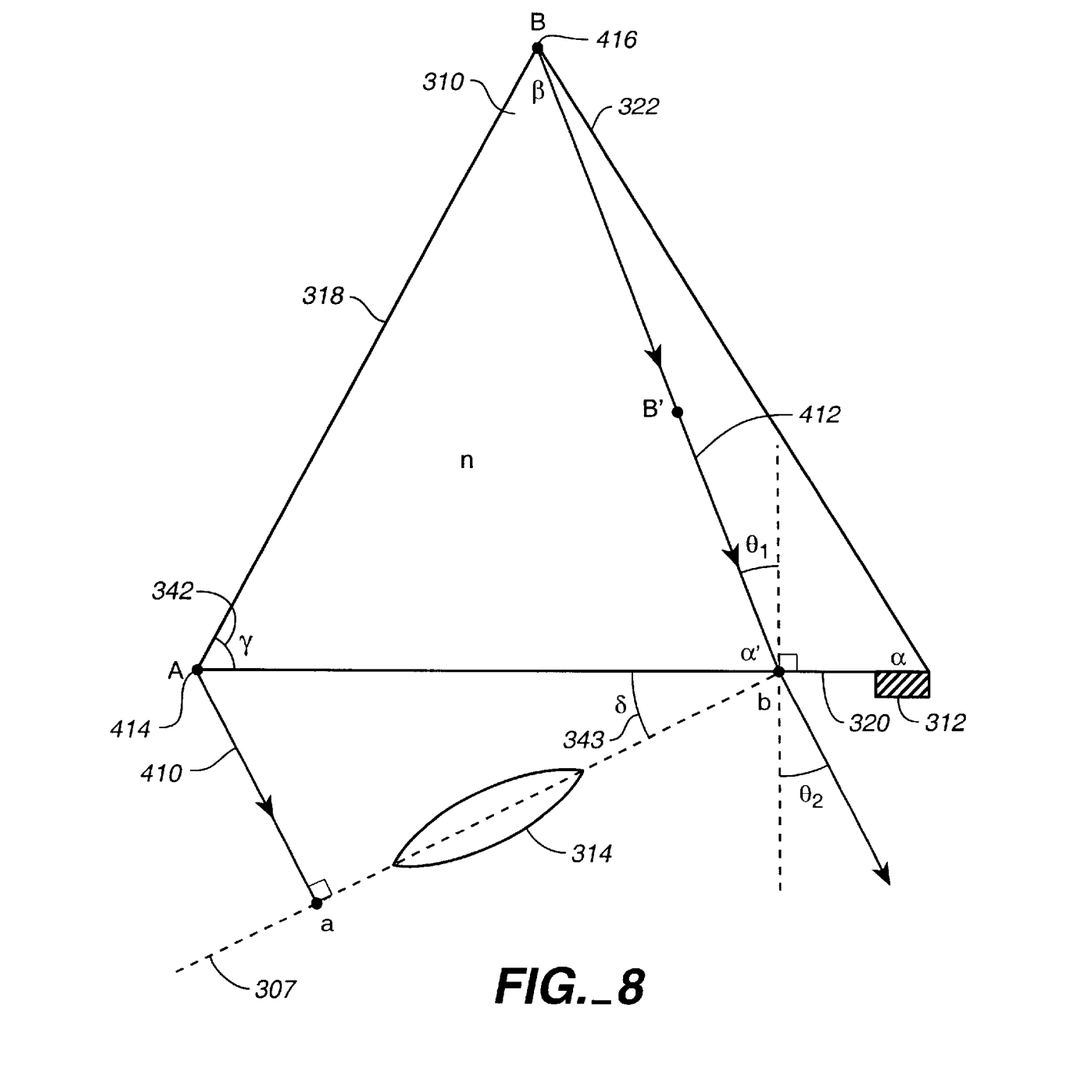
FIG. 8 is a schematic diagram of the image acquisition system shown in FIG. 4 illustrating preferred prism and lens assembly configuration.

Referring to FIG. 8, the appropriate angle at which to tilt lens assembly 314 can be determined. In FIG. 8, light rays 410 and 412 are scattered from imaging surface edge 414 and opposite imaging surface edge 416, respectively. Lens plane 307 is a theoretical representation of lens assembly 314 as the thickness of the lens assembly goes to zero. Distance Aa is the distance from the apparent image of an object in prism 310 to lens plane 307 along light ray 410 and distance B'b is the distance from the apparent image of an object in prism 310 along light ray 412. In order to substantially eliminate trapezoidal distortion, distance Aa must be substantially equal to distance B'b. Because B'b is the apparent depth of an object at edge B in prism 310, then, as discussed in the Background section:

B'b=Bb/n where Bb is the distance from point B, at edge 416, to point b on prism 310. The requirement for substantial elimination of trapezoidal distortion and improvement in overall image sharpness can be expressed as:

$$Aa = Bb/n \quad \text{(Eq. 1)}$$

The angle of incidence of light ray 412 on viewing surface 320, that is, the angle between a normal line to viewing surface 320 and light ray 412 inside prism 310, is shown in FIG. 8 as $\theta_1$. The angle of refraction of light ray 412 after it passes out of prism 310 is shown as $\theta_2$. Thus, by Snell's law:

$$n = \sin\theta_2 / \sin\theta_1 \quad \text{(Eq. 2)}$$

Also, using fundamental trigonometric relationships, it can be shown that:

$$AB\cos\gamma + Bb\cos\alpha' = Ab \quad \text{(Eq. 3)}$$

where AB is the length of the imaging surface of prism 310 from point A to point B; Ab is the length of segment Ab on viewing surface 320; $\alpha'$ is the angle between light ray 412 and viewing surface 320, which equals $90° - \theta_1$; and $\gamma$ is the angle between imaging surface 318 and viewing surface 320 (also shown as angle 342 in FIG. 8).

Finally, using the law of sines, it can be shown that:

$$AB/Bb = \cos\theta_1 / \sin\gamma \quad \text{(Eq. 4)}$$

Using equations 1, 2, 3, and 4 above, it can be shown that in order for trapezoidal distortion to be substantially eliminated, and overall image sharpness increased, the following condition relating the angles of prism 310 with the angle which lens plane 307 forms with viewing surface 320 must be met:

$$(n^2 - \sin^2\delta)^{1/2}(\cot\gamma)(\sin\delta) + \sin^2\delta = 1 \quad \text{(Eq. 5)}$$

Where, as shown in FIG. 8, $\delta$ is the angle that lens plane 307 of lens assembly 314 forms with viewing surface 320. Thus, imaging system 308, in accordance with the present invention, is preferably configured in accordance with equation 5 to substantially eliminate trapezoidal distortion and improve overall image sharpness.

However, in manufacturing imaging system 308, achieving precise tolerances for angles $\gamma$ and $\delta$ can be difficult and expensive. Therefore, an imaging system in accordance with the present invention and allowing for a 30% manufacturing tolerance is preferably configured in accordance with the equation 6 below:

$$0.7 \leq (n^2 - \sin^2\delta)^{1/2}(\cot\gamma)(\sin\delta) + \sin^2\delta \leq 1.3 \quad \text{(Eq. 6)}$$

More preferably, an imaging system in accordance with the present invention and allowing for a 15% manufacturing tolerance is configured in accordance with equation 7 below:

$$0.85 \leq (n^2 - \sin^2\delta)^{1/2}(\cot\gamma)(\sin\delta) + \sin^2\delta \leq 1.15 \quad \text{(Eq. 7)}$$

Most preferably, an imaging system in accordance with the present invention and allowing for a 7.5% manufacturing tolerance is configured in accordance with equation 8 below:

$$0.925 \leq (n^2 - \sin^2\delta)^{1/2}(\cot\gamma)(\sin\delta) + \sin^2\delta \leq 1.075 \quad \text{(Eq. 8)}$$

As noted above, by configuring imaging system 308 in accordance with one of equations 5–8 above, trapezoidal distortion can be substantially reduced or eliminated and overall image sharpness can be improved. This advantageously facilitates more accurate image processing and comparison by an image acquisition system.

Prism 310 can be made of glass, acrylic or any other transparent material having an index of refraction higher than 1 (that of air). Prisms having the preferred index of refraction and angles are commercially available from Shinkwang Ltd. of Seoul, Korea and are fabricated of glass having the designation LaK-7 or LaK-8.

Lens assemblies such as lens assembly 314 are commercially available from Woorim Optical Systems Ltd. of Seoul, Korea and are preferably fabricated from a glass having the commercial designation of BK7. If more than one element is used in lens assembly 314, as shown in FIG. 6, the individual elements can be aligned and spaced by placing them in a frame fabricated by plastic molding or any other fabrication means as is known in the art.

Light source 312 preferably consists of four standard LEDs positioned in a straight array on a circuit board. Powering of LEDs is well known by those skilled in the art. Image sensor 316 is preferably a CMOS type sensor and is commercially available from Hyundai Electronics of Seoul, Korea, VLSI Vision, Ltd. of San Jose, Calif., or Omnivision Technologies Inc. of Sunnyvale, Calif.

To secure the components of image acquisition into the relative positions as shown in FIG. 4, a frame having holding slots for each component can be plastic molded or otherwise fabricated. Light source 312 can be either placed in a holding slot adjacent to viewing surface 320 or attached directly to viewing surface 320 using adhesive as known in the art.

Figure 9:
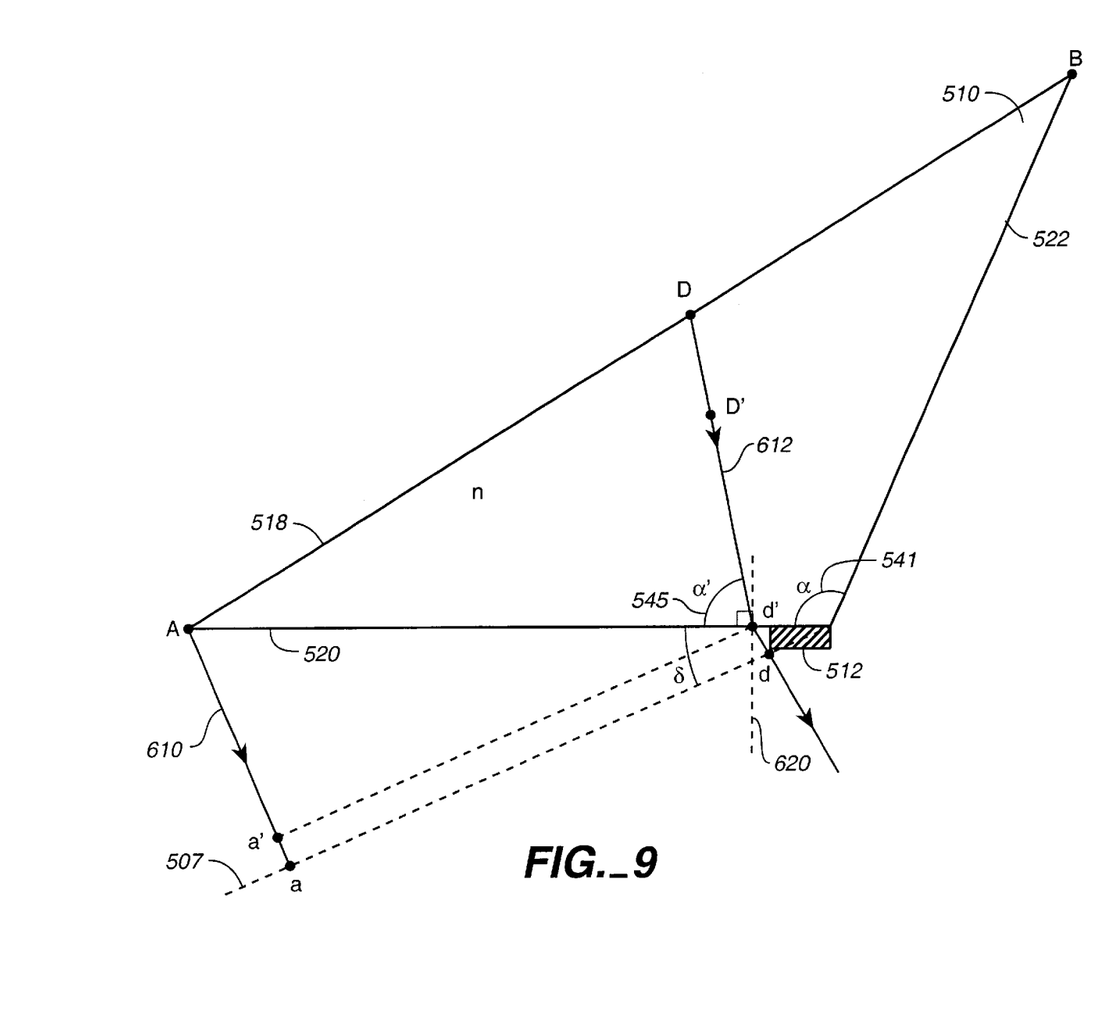
FIG. 9 is a schematic diagram showing an alternate embodiment of a prism which can be used with the image acquisition system of the present invention illustrating a scattered light ray path.

Equations 5–8 were derived assuming that the entire width AB of imaging surface 318 would be used in capturing an image. However, less than the entire imaging surface of a prism can be used to capture an image. This may be the case, for example, if a triangular prism having an angle greater than or equal to 90 degrees is used as a light refractor. However, if the entire imaging surface of a prism is not used to image an object, a requirement in addition to being configured according to equations 5–8 above is preferably met by the configuration of such an imaging system. To illustrate this additional requirement, FIG. 9 shows a triangular prism 510 having an obtuse angle 541. Triangular prism 510 includes a planar imaging surface 518, a planar viewing surface 520 and a planar further surface 522. FIG. 9 also shows a light source 512 which can be substantially the same as light source 312, and lens plane 507 of a lens assembly (not shown). A lens assembly used with prism 510 can be substantially the same as lens assembly 314.

As shown in FIG. 9, a light ray 612 is scattered from point D on imaging surface 518 and a light ray 610 is scattered from imaging surface 518 at point A. Prism 510 and lens plane 507 are configured in accordance with equation 5 above. Additionally, segment a'd' is parallel to lens plane 507. And, length D'd' is the apparent depth in prism 510 of the image of an object at point D on imaging surface 518. Thus, the length of segments Aa' and D'd' are the equal. Because the index of refraction of prism 510 is greater than 1, as light ray 612 leaves prism 510 at point d', it will refract away from a normal line 620 to viewing surface 520.

Angle 545, labeled as α' in FIG. 9, which is the angle formed by the intersection of light ray 612 and viewing surface 520, and is adjacent to the intersection of the viewing surface and the imaging surface, is less than 90 degrees. Thus, as light ray 612 passes out of prism 510 and refracts away from normal line 620, it will travel in a path parallel to that of light ray 610 outside of prism 510. Therefore, the lengths of segments a'a and d'd are also equal. Accordingly, the total path lengths from the apparent image in prism 510 to the lens plane 507, and ultimately the an image sensor (not shown) will be the same for an object on imaging surface 518 at both point A and point D. In this way overall image sharpness can be increased.

Figure 10:
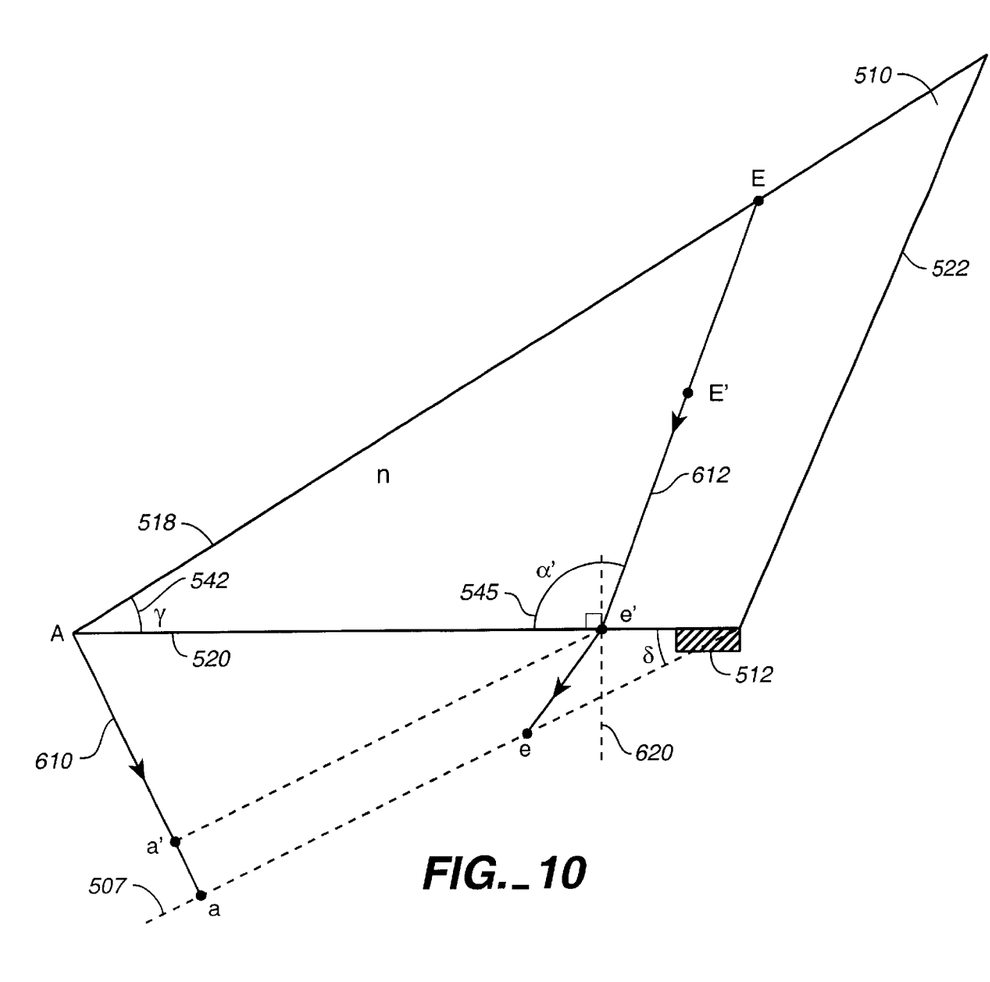
FIG. 10 is a schematic diagram of the prism shown in FIG. 9 illustrating an alternate scattered light ray path.

Referring now to FIG. 10, which also shows prism 510, the path length from the apparent image in prism 510 of an object placed at point E on imaging surface 518 will not be equal to the path length from the apparent image in prism 510 of an object placed at point A on prism 510. Light ray 612 is a scattered light ray from an object placed at point E on imaging surface 518. As above, because prism 510 has an index of refraction which is greater than 1, as light ray 612 exits prism 510 at point e', it will refract away from normal line 620 to viewing surface 520. Therefore, because angle 545, labeled α', is greater than 90 degrees, the path of light ray 612 outside of prism 510 is not parallel to the path of light ray 610 outside of prism 510. Because light rays 610 and 612 are not parallel, the length of segment e'e will be different from the length of segment a'a. This means that the total path length from the apparent image in prism 510 to lens plane 507 will be different for an object at point E on imaging surface 318 than for an object at point A thereon. Thus, relatively large trapezoidal distortion and/or a relatively out of focus image will result.

As noted above, in order to avoid this, when a prism having a 90 degree or greater angle is used in an imaging system in accordance with the present invention, preferably, less than the entire width of the imaging surface is used to image an object. As shown above, when α' is less than 90 degrees, and the image capturing system is configured according to equations (5) through (8) above, trapezoidal distortion can be substantially eliminated. And, when α' is greater or equal to 90 degrees trapezoidal distortion can result. Thus, if less than the entire width of the imaging surface 518 of a prism is to be used to place an object to be imaged against, each portion of the imaging surface 518 to be used for imaging must be able to have at least one light ray scattered therefrom such that the intersection of the one light ray and the viewing surface 520 form an angle, α' in FIGS. 9 and 10, adjacent to the intersection of the viewing surface and the imaging surface, which is less than 90 degrees. This criteria advantageously facilitates reduction or substantial elimination of trapezoidal distortion and increase in overall image sharpness in an imaging system configured in accordance with one of equations 5–8 above.

Prism 510, and light source 512 can be manufactured in substantially the same way and of the same materials as discussed above with respect to prism 310 and light source 312.

Many widely different embodiments of the present invention may be constructed without departing from the spirit and scope of the present invention. It should be understood that the present invention is not limited to the specific embodiments described in the specification. For example, though the above disclosed embodiment of the present invention are described with reference to imaging a fingerprint, any other type of patterned object is contemplated to be imaged with the present invention.

What is claimed is:

1. A compact apparatus for forming a high contrast, low distortion image of a patterned object including:
   a light refractor for reflecting and refracting light, the light refractor including:
   an imaging surface against which a patterned object to be imaged is to be placed to form an apparent image of the patterned object in the light refractor;
   a viewing surface adjacent to the imaging surface and through which an image of the object to be imaged is projected, the viewing surface forming an angle γ with the imaging surface; and
   a further surface adjacent to the imaging surface
   at least one lens adjacent to the viewing surface and for receiving and focusing an image of a patterned object projected through the viewing surface, the lens having a lens plane which is perpendicular to an optical axis of the lens, the lens plane forming an angle δ with the viewing surface;
   wherein the angles γ and δ are formed to substantially equalize a path length of a first light ray traveling from one part of the apparent image of the patterned object to the lens plane with a path length of any other light ray substantially parallel to the first light ray and traveling from another part of the apparent image of the patterned object to the lens plane.

2. The apparatus of claim 1 wherein the angles γ and δ are related by the equation:

$$0.7 \leq (n^2 - \sin^2\delta)^{1/2}(\cot\gamma)(\sin\delta) + \sin^2\delta \leq 1.3.$$

3. The apparatus of claim 1 wherein the angles γ and δ are related by the equation:

$$0.85 \leq (n^2 - \sin^2\delta)^{1/2}(\cot\gamma)(\sin\delta) + \sin^2\delta \leq 1.15.$$

4. The apparatus of claim 1 wherein the angles γ and δ are related by the equation:

$$0.925 \leq (n^2 - \sin^2\delta)^{1/2}(\cot\gamma)(\sin\delta) + \sin^2\delta \leq 1.075.$$

5. The apparatus of claim 1 wherein the part of the imaging surface against which an object to be imaged is to be placed is able to have at least one light ray scattered from each portion thereof such that the intersection of the at least one light ray and the viewing surface form a first angle, the first angle being interior to a triangular area formed by the viewing surface, the imaging surface and the at least one light ray, which is less than 90 degrees.

6. The apparatus of claim 1 further including at least one light source located adjacent to the light refractor and for emitting incident light which enters the light refractor to create an image of the patterned object at the viewing surface.

7. The apparatus of claim 6 wherein:

the light refractor includes:

a first edge opposite the imaging surface and adjacent to the viewing surface; and the light source is a strip of light emitting diodes (LEDs) oriented towards and parallel with the viewing surface and adjacent to the first edge.

8. The apparatus of claim 1 wherein:

the at least one lens has a diameter; the object to be imaged has a length dimension; and the diameter of the at least one lens is smaller than the length dimension of the object to be imaged.

9. The apparatus of claim 2 wherein the part of the imaging surface against which an object to be imaged is to be placed is able to have at least one light ray scattered from each portion thereof such that the intersection of the at least one light ray and the viewing surface form a first angle, the first being interior to a triangle area formed by the viewing surface, the imaging surface and the at least one light ray which is less than 90 degrees.

10. The apparatus of claim 3 wherein the part of the imaging surface against which an object to be imaged is to be placed is able to have at least one light ray scattered from each portion thereof such that the intersection of the at least one light ray and the viewing surface form a first angle, the first being interior to a triangle area formed by the viewing surface, the imaging surface and the at least one light ray which is less than 90 degrees.

11. The apparatus of claim 4 wherein the part of the imaging surface against which an object to be imaged is to be placed is able to have at least one light ray scattered from each portion thereof such that the intersection of the at least one light ray and the viewing surface form a first angle, the first angle being interior to a triangular area formed by the viewing surface, the imaging surface and the at least one light ray, which is less than 90 degrees.

12. A method of imaging a patterned object comprising:

providing a light refractor having an imaging surface, a viewing surface and a further surface;

forming an angle $\gamma$ between a plane defined by the viewing surface and a plane defined by the imaging surface;

placing the patterned object against the imaging surface of the light refractor;

projecting incident light into the light refractor;

scattering the incident light off the imaging surface and patterned object and through the viewing surface;

providing a lens adjacent to the viewing surface;

forming an angle $\delta$ between the plane defined by the viewing surface and a lens plane of the lens;

fixing angles $\delta$ and angle $\gamma$ to equalize a path length of a first light ray traveling from one part of an apparent image of the patterned object in the light refractor to the lens plane with a path length of any other light ray substantially parallel to the first light ray and traveling from another part of the apparent image of the patterned object to the lens plane.

13. The method of claim 12 wherein the step of fixing angle $\delta$ and angle $\gamma$ includes relating angle $\delta$ and angle $\gamma$ according to the equation:

$$0.7 \leq (n^2 - \sin^2\delta)^{1/2}(\cot\gamma)(\sin\delta) + \sin^2\delta \leq 1.3.$$

14. The method of claim 13 wherein the step of fixing angle $\delta$ and angle $\gamma$ includes relating angle $\delta$ and angle $\gamma$ according to the equation:

$$0.85 \leq (n^2 - \sin^2\delta)^{1/2}(\cot\gamma)(\sin\delta) + \sin^2\delta \leq 1.15.$$

15. The method of claim 12 wherein the step of fixing angle $\delta$ and angle $\gamma$ includes relating angle $\delta$ and angle $\gamma$ according to the equation:

$$0.925 \leq (n^2 - \sin^2\delta)^{1/2}(\cot\gamma)(\sin\delta) + \sin^2\delta \leq 1.075.$$

16. The method of claim 12 wherein the step of placing the patterned object against the imaging surface includes placing the patterned object against portions of the imaging surface which are able to have at least one light ray scattered therefrom such that the intersection of the at least one light ray and the viewing surface form a first angle, the first angle being interior to a triangular area formed by the viewing surface, the imaging surface and the at least one light ray, which is less than 90 degrees.

17. The method of claim 13 wherein the step of placing the patterned object against the imaging surface includes placing the patterned object against portions of the imaging surface which are able to have at least one light ray scattered therefrom such that the intersection of the at least one light ray and the viewing surface form a first angle, the first angle being interior to a triangular area formed by the viewing surface, the imaging surface and the at least one light ray, which is less than 90 degrees.

18. The method of claim 14 wherein the step of placing the patterned object against the imaging surface includes placing the patterned object against portions of the imaging surface which are able to have at least one light ray scattered therefrom such that the intersection of the at least one light ray and the viewing surface form a first angle, the first angle being interior to a triangular area formed by the viewing surface, the imaging surface and the at least one light ray, which is less than 90 degrees.

19. The method of claim 15 wherein the step of placing the patterned object against the imaging surface includes placing the patterned object against portions of the imaging surface which are able to have at least one light ray scattered therefrom such that the intersection of the at least one light ray and the viewing surface form a first angle, the first angle being interior to a triangular area formed by the viewing surface, the imaging surface and the at least one light ray, which is less than 90 degrees.

* * * * *

(12) EX PARTE REEXAMINATION CERTIFICATE (7238th)
United States Patent
Teng et al.

(10) Number: US 6,324,020 C1
(45) Certificate Issued: *Dec. 15, 2009

(54) METHOD AND APPARATUS FOR REDUCTION OF TRAPEZOIDAL DISTORTION AND IMPROVEMENT OF IMAGE SHARPNESS IN AN OPTICAL IMAGE CAPTURING SYSTEM

(75) Inventors: Harry H. Teng, Stanford, CA (US); Sung-Chan Jo, Seoul (KR)

(73) Assignee: Morrison & Foerster LLP, San Francisco, CA (US)

Reexamination Request:
No. 90/010,237, Aug. 6, 2008

Reexamination Certificate for:
Patent No.: 6,324,020
Issued: Nov. 27, 2001
Appl. No.: 09/368,442
Filed: Aug. 4, 1999

( * ) Notice: This patent is subject to a terminal disclaimer.

(51) Int. Cl.
*G06K 9/00* (2006.01)

(52) U.S. Cl. .................. 359/726; 359/737; 359/798; 359/831; 356/71; 382/127
(58) Field of Classification Search .................. None
See application file for complete search history.

(56) References Cited

U.S. PATENT DOCUMENTS 6,381,347 B1    4/2002    Teng et al.

FOREIGN PATENT DOCUMENTS

| GB | 1520483 | 8/1978 |
|---|---|---|
| JP | 62-134852 | 12/1988 |
| KR | 1994-0007344 | 10/1994 |

*Primary Examiner*—Lynne H. Browne (57) ABSTRACT

An apparatus and method for acquiring an image of a patterned object such as a fingerprint including a light refracting device, a focusing lens, and a light source. The light refracting device can, for example, be a prism and includes an imaging surface, a light receiving surface and a viewing surface. Incident light from the light source is projected through the light receiving surface and reflected off a surface other than the imaging surface. This reflected light is then projected onto the imaging surface to create an image of the patterned object from substantially all scattered light through the viewing surface. The lens is placed adjacent to the viewing surface to focus the light on an image sensor. The apparatus is configured to reduce or substantially eliminate trapezoidal distortion and improve overall image sharpness in an image of an object created by the apparatus.

US 6,324,020 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–6 and 8–11 are cancelled.

Claims 7 and 12 are determined to be patentable as amended.

Claims 13–19, dependent on an amended claim, are determined to be patentable.

New claims 20–28 are added and determined to be patentable.

7. [The apparatus of claim 6 wherein:] *A compact apparatus for forming a high contrast, low distortion image of a patterned object including:*
   *a light refractor for reflecting and refracting light, the light refractor including:*
   *an imaging surface against which a patterned object to be imaged is to be placed to form an apparent image of the patterned object in the light refractor;*
   *a viewing surface adjacent to the imaging surface and through which an image of the object to be imaged is projected, the viewing surface forming an angle γ with the imaging surface;*
   *a further surface adjacent to the imaging surface;*
   *at least one lens adjacent to the viewing surface and for receiving and focusing an image of a patterned object projected through the viewing surface, the lens having a lens plane which is perpendicular to an optical axis of the lens, the lens plane forming an angle δ with the viewing surface;*
   *wherein the angles γ and δ are formed to substantially equalize a path length of a first light ray traveling from one part of the apparent image of the patterned object to the lens plane with a path length of any other light ray substantially parallel to the first light ray and traveling from another part of the apparent image of the patterned object to the lens plane;*
   *wherein the compact apparatus further including at least one light source located adjacent to the light refractor and for emitting incident light which enters the light refractor to create an image of the patterned object at the viewing surface; and*
   the light refractor includes: a first edge opposite the imaging surface and adjacent to the viewing surface; and
   the light source is a strip of light emitting diodes (LEDs) oriented towards and parallel with the viewing surface and adjacent to the first edge.

12. A method of imaging a patterned object comprising:
    providing a light refractor having an image surface, a viewing surface and a further surface;
    forming an angle γ between a plane defined by the viewing surface and a plane defined by the imaging surface;
    placing the patterned object against the imaging surface of the light refractor;
    projector incident light into the light refractor *from a light source located adjacent to the viewing surface of the light refractor, and wherein the incident light enters the light refractor to create an apparent image of the patterned object*;
    scattering the incident light off the imaging surface and *the* patterned object and through the viewing surface;
    providing a lens adjacent to the viewing surface;
    forming an angle δ between the plane defined by the viewing surface and a lens plane of the lens;
    fixing angles δ and angle γ to equalize a path length of a first light ray traveling from one part of [an] *the* apparent image of the patterned object in the light refractor to the lens plane with a path length of any other light ray substantially parallel to the first light ray and traveling from another part of the apparent image of the patterned object to the lens plane.

20. *A compact apparatus for forming a high contrast, low distortion image of a patterned object including:*
    *a light refractor for reflecting and refracting light, the light refractor including:*
    *an imaging surface against which a patterned object to be imaged is to be placed to form an apparent image of the patterned object in the light refractor;*
    *a viewing surface adjacent to the imaging surface and through which an image of the object to be imaged is projected, the viewing surface forming an angle γ with the imaging surface; and*
    *a further surface adjacent to the imaging surface*
    *at least one lens adjacent to the viewing surface and for receiving and focusing an image of a patterned object projected through the viewing surface, the lens having a lens plane which is perpendicular to an optical axis of the lens, the lens plane forming an angle δ with the viewing surface;*
    *wherein the angles γ and δ are formed to substantially equalize a path length of a first light ray traveling from one part of the apparent image of the patterned object to the lens plane with a path length of any light ray substantially parallel to the first light ray and traveling from another part of the apparent image of the patterned object to the lens plane, and*
    *wherein the compact apparatus further including at least one light source located adjacent to the viewing surface of the light refractor and for emitting incident light which enters the light refractor to create the apparent image of the patterned object.*

21. *The apparatus of claim 20 wherein the angles γ and δ are related by the equation:*

$$0.7 <= (n^2 - \sin^2\delta)^{1/2}(\cot\gamma)(\sin\delta) + \sin^2\delta <= 1.3.$$

22. *The apparatus of claim 20 wherein the angles γ and δ are related by the equation:*

$$0.85 <= (n^2 - \sin^2\delta)^{1/2}(\cot\gamma)(\sin\delta) + \sin^2\delta <= 1.15.$$

23. *The apparatus of claim 20 wherein the angles γ and δ are related by the equation:*

$$0.925 <= (n^2 - \sin^2\delta)^{1/2}(\cot\gamma)(\sin\delta) + \sin^2\delta <= 1.0725.$$

24. *The apparatus of claim 20 wherein the part of the imaging surface against which an object to be imaged is to* be placed is able to have at least one light ray scattered from each portion thereof such that the intersection of the at least one light ray and the viewing surface form a first angle, the first angle being interior to a triangular area formed by the viewing surface, the imaging surface and the at least one light ray, which is less than 90 degrees.

25. The apparatus of claim 20 wherein:

the at least one lens has a diameter; the object to be imaged has a length dimension; and the diameter of the at least one lens is smaller than the length dimension of the object to be imaged.

26. The apparatus of claim 21 wherein the part of the imaging surface against which an object to be imaged is to be placed is able to have at least one light ray scattered from each portion thereof such that the intersection of the at least one light ray and the viewing surface form a first angle, the first being interior to a triangle area formed by the viewing surface, the imaging surface and the at least one light ray which is less than 90 degrees.

27. The apparatus of claim 22 wherein the part of the imaging surface against which an object to be imaged is to be placed is able to have at least one light ray scattered from each portion thereof such that the intersection of the at least one light ray and the viewing surface form a first angle, the first being interior to a triangle area formed by the viewing surface, the imaging surface and the at least one light ray which is less than 90 degrees.

28. The apparatus of claim 23 wherein the part of the imaging surface against which an object to be imaged is to be placed is able to have at least one light ray scattered from each portion thereof such that the intersection of the at least one light ray and the viewing surface form a first angle, the first angle being interior to a triangular area formed by the viewing surface, the imaging surface and the at least one light ray, which is less than 90 degrees.

\* \* \* \* \*